United States Patent
Korol et al.

(10) Patent No.: US 12,229,347 B1
(45) Date of Patent: Feb. 18, 2025

(54) MOTORIZED FINGER ACTIVATOR DEVICE FOR INTERACTION WITH A TOUCH-SENSITIVE COMPUTING INPUT DEVICE

(71) Applicants: Victor Korol, San Diego, CA (US); Evgeny Korol, San Diego, CA (US)

(72) Inventors: Victor Korol, San Diego, CA (US); Evgeny Korol, San Diego, CA (US)

(73) Assignee: Work-Life Balance Corporation, LLC, San Diego, CA (US)

( * ) Notice: Subject to any disclaimer, the term of this patent is extended or adjusted under 35 U.S.C. 154(b) by 0 days.

(21) Appl. No.: 18/433,524

(22) Filed: Feb. 6, 2024

(51) Int. Cl.
*G06F 3/03* (2006.01)

(52) U.S. Cl.
CPC ...................................... *G06F 3/03* (2013.01)

(58) Field of Classification Search
CPC .... G06V 40/45; G06V 40/172; G06V 10/764; G06V 40/168; G06V 40/40; G06V 10/82; G06F 18/253
See application file for complete search history.

(56) References Cited

U.S. PATENT DOCUMENTS

| 11,762,488 B1 | 9/2023 | Korol | |
|---|---|---|---|
| 2005/0265586 A1* | 12/2005 | Rowe | G06V 40/1394 382/124 |
| 2009/0306531 A1* | 12/2009 | Leuthardt | A61B 5/4076 600/544 |
| 2009/0326406 A1* | 12/2009 | Tan | G06F 3/017 341/20 |
| 2013/0113709 A1* | 5/2013 | Wine | G06F 1/163 345/169 |
| 2019/0212827 A1* | 7/2019 | Kin | G02B 27/0172 |

FOREIGN PATENT DOCUMENTS

JP 2008501196 A * 1/2006 ........... A61B 5/0059

* cited by examiner

*Primary Examiner* — Shaheda A Abdin
(74) *Attorney, Agent, or Firm* — Plager Schack LLP; Mark H. Plager, Esq.; Stephen Hallberg, Esq.

(57) ABSTRACT

A motorized finger activator device for interaction with a touch-sensitive computing input device is disclosed. Use of the motorized finger activator device for interaction with a touch-sensitive computing input device will work for users who do not use computer mouse.

15 Claims, 5 Drawing Sheets

MOTORIZED FINGER ACTIVATOR DEVICE FOR INTERACTION WITH A TOUCH-SENSITIVE COMPUTING INPUT DEVICE

BACKGROUND

Embodiments of the invention described in this specification relate generally to computer peripheral devices, and more particularly, to a motorized finger activator device for interaction with a touch-sensitive computing input device to enable non-mouse activation of input to avoid sleep mode.

Typically, personal computers (PCs) fall into sleep mode when a user is inactive for a period of time. In most cases, the user is required to enter a password to get the PC out of sleep mode and continue work. This is a big inconvenience for a user when he takes a break or is passively reviewing content or listening to an online video meeting.

One of the existing options is for users to utilize a mouse jiggler device. This may work well for users of desktop PCs, where mouse usage is typically very high. However, many PC users do not use conventional desktop systems, but instead use laptop PCs. While it is possible to use a mouse with a laptop, it is not required. Instead of a mouse, laptops are often equipped with a surface-level touchpad device with a touch-sensitive surface (the 'touchpad') and (optionally) one or more button(s) that a user may interact with. Consequently, there is a high percentage of laptop users who do not use a computer mouse. Thus, the existing mouse jiggler devices do not offer a solution to the 'sleep mode' problem.

Therefore, what is needed is a motorized finger that will work for users who do not use computer mouse.

BRIEF DESCRIPTION

A novel motorized finger activator device for interaction with a touch-sensitive computing input device is disclosed. Use of the motorized finger activator device for interaction with a touch-sensitive computing input device will work for users who do not use computer mouse.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this specification provide a motorized finger activator device for interaction with a touch-sensitive computing input device. Use of the motorized finger activator device for interaction with a touch-sensitive computing input device will work for users who do not use computer mouse.

In this specification, the term "touchpad" means a touch pad, a touch-sensitive device, a track pad or trackpad, or any other electrically capacitative touch-based surface device or element that is configured to receive touch inputs.

Figure 1:
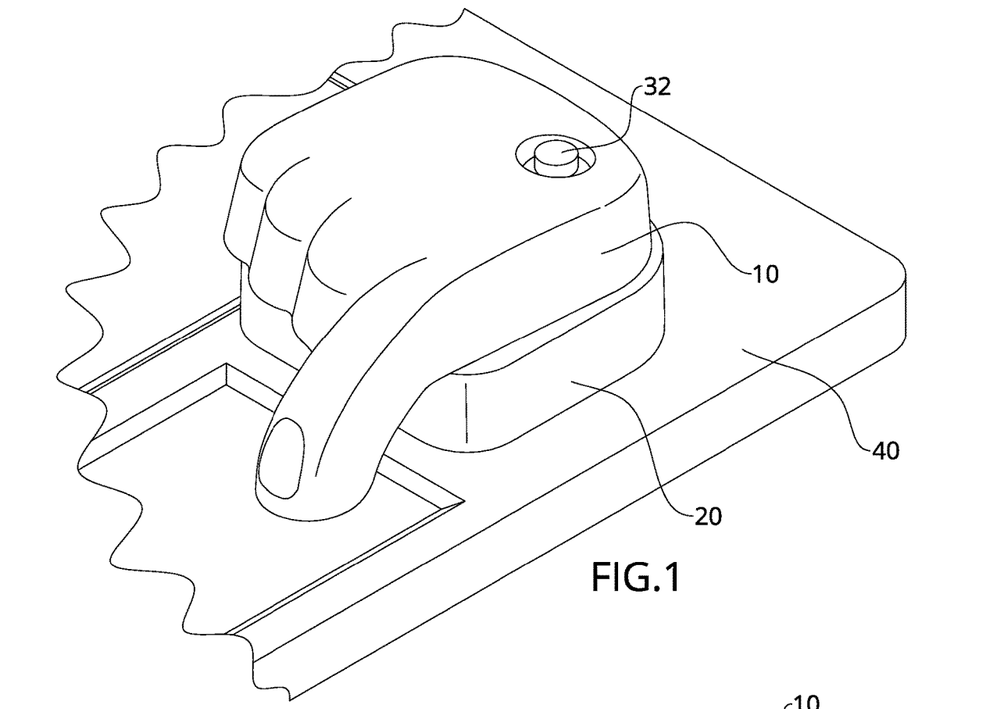
FIG. 1 conceptually illustrates a perspective view of a motorized finger activator device in use to provide interaction with a touch-sensitive computing input device in some embodiments.

By way of example, FIG. 1 conceptually illustrates a perspective view of a motorized finger activator device in use to provide interaction with a touch-sensitive computing input device in some embodiments. As shown in this figure, the motorized finger activator device comprises a hand with finger 10, a base 20, a switch 32, and a laptop 40. The hand with finger 10 provides an upper portion of the motorized finger activator device. The base 20 provides a lower portion of the motorized finger activator device. The switch 32 is exposed through a surface of the hand with finger 10 and is configured to power on and off the motorized finger activator device by pressing down on the switch 32. The laptop 40 is the computing device for which the motorized finger activator device is deployed to provide certain input along the touchpad, so as to prevent the laptop 40 from falling into sleep mode due to lack of input or interaction. As can be seen in this view, the finger portion of the hand with finger 10 is positioned at the touchpad of the laptop 40. On the other hand, the base 20 is positioned on a surface of the laptop 40, nearby the touchpad so that the finger portion of the hand with finger 10 may contact/touch the touch pad of the laptop 40. When the power is off, the motorized finger activator device remains stationary on the touchpad and does not effectuate input in connection with the touchpad of the laptop 40. However, by pressing the switch 32 down, the motorized finger activator device is powered on. This starts the oscillating motion of the finger contact area, so that touch/contact of the laptop 40 touchpad by the finger portion of the hand with finger 10 will be recognized and captured by the touchpad as an input. When powered on, a vertical pivot with additional horizontal angular degree of freedom enables the hand with finger 10 to move back and forth along the touchpad by at least ten millimeters (10 mm) and often approximately thirteen millimeters (13 mm), and also move up and down by approximately two or more millimeters (2 mm or more).

It is important to note that the laptop 40 shown in FIG. 1 normally would not have a computer mouse attached. However, even with a computer mouse attached, the touchpad of the laptop 40 may be configured to accept touch/contact input even when the mouse is attached. In that case, the motorized finger activator device is able to provide sufficient touch/contact input, as demonstrated in FIG. 1, to overcome the problems noted above and to avoid having the laptop 40 timeout by inactivity. Yet, one may argue that if a mouse is attached to the laptop 40, that it would be possible to simply use a conventional style jiggler device. Nothing about the motorized finger activator device would invalidate that usage—in fact, a conventional style jiggler device is simply a different mechanism than the motorized finger activator device of the present disclosure, even though both are configured to overcome the sleep mode problems noted above. On the other hand, when the laptop 40 does not have an attached computer mouse, the use of a conventional style jiggler device is simply not going to help in any way. This is where the motorized finger activator device comes in with another, different solution to the sleep mode problem. Specifically, embodiments of the motorized finger activator device for interaction with a touch-sensitive computing input device described in this specification solve such problems by way of a motor-driven finger that is physically placed on a laptop with a touchpad surface such that a fingertip of the motorized finger is configured to touch the touchpad. Moving the finger portion of the device results in input being sensed/captured by the laptop, thereby maintaining the computer's active state and preventing slippage into the sleep mode state.

Embodiments of the motorized finger activator device for interaction with a touch-sensitive computing input device described in this specification differ from and improve upon currently existing options. In particular, conventional mouse jiggler devices send signals to a computer by 'jiggling' the connected computer mouse, thereby keeping it active. However, to avoid sleep mode, the use of the mouse jiggler requires a computer mouse to be physically or wirelessly connected to the computer. When people commonly use laptops without a connected mouse, the problem with sleep mode activation remains present. So, mouse jigglers are a limited solution for a limited number of PC users who happen to also use a computer mouse. However, the motorized finger activator device of the present disclosure works on a laptop touchpad, providing the requisite 'input' by touch activation needed to avoid triggering the sleep mode lockout of the laptop. Thus, the motorized finger activator device provides a solution for users who do not use computer mouse.

The motorized finger activator device for interaction with a touch-sensitive computing input device of the present disclosure may be comprised of the following elements. This list of possible constituent elements is intended to be exemplary only and it is not intended that this list be used to limit the motorized finger activator device of the present application to just these elements. Persons having ordinary skill in the art relevant to the present disclosure may understand there to be equivalent elements that may be substituted within the present disclosure without changing the essential function or operation of the motorized finger activator device.

1. Base, made of electrically conductive plastic
2. Hand with finger, made of electrically conductive plastic
3. Gearmotor, with output shaft, for 1.5 VDC, 2 to 8 rpm
4. Eccentric Cam
5. Battery (AA battery) in a battery compartment/holder
6. On/Off Switch
7. Pivot Screw
8. Connecting Wires
9. Conductive cushion, 8×8 mm, made of an electromagnetic interference (EMI) gasket strip that to shield from electromagnetic interference The various elements of the motorized finger activator device for interaction with a touch-sensitive computing input device of the present disclosure may be related in the following exemplary fashion. It is not intended to limit the scope or nature of the relationships between the various elements and the following examples are presented as illustrative examples only. The base houses the gearmotor and the battery. The battery itself is housed in a separate battery holder/compartment. The hand with finger is attached to the base with the pivot screw. The switch is attached to the hand with finger. The wires connect the battery, the gearmotor, and the switch to complete the circuit. The eccentric cam is attached to the output shaft of the gearmotor. The eccentric cam is contained with walls/brackets on the hand with finger, such that when the eccentric cam rotates, the hand with finger performs an oscillating rotational movement around the pivot screw. The conductive cushion is attached to the tip of the finger portion of the hand with finger.

Figure 2:
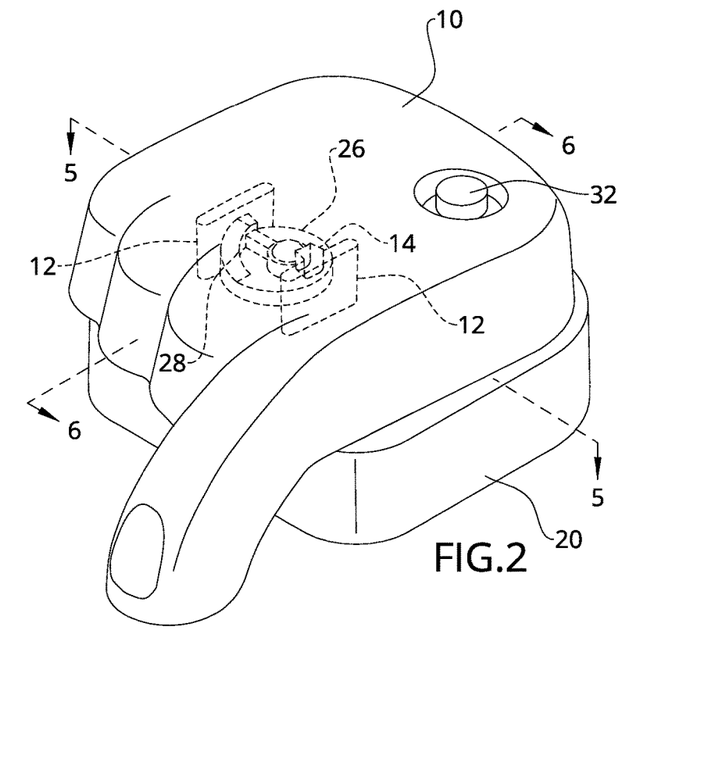
FIG. 2 conceptually illustrates a perspective view of a motorized finger activator device and some internal components of the motorized finger activator device in some embodiments.

By way of example, FIG. 2 conceptually illustrates a perspective view of a motorized finger activator device and some internal components of the motorized finger activator device. Specifically, the motorized finger activator device comprises the hand with finger 10, the base 20, and the switch 32, as described above by reference to FIG. 1. The motorized finger activator device shown in FIG. 2 further comprises a pair of eccentric brackets 12, a lift tab 14, an eccentric cam 26, and a lift ramp 28. The pair of eccentric brackets 12, the lift tab 14, the eccentric cam 26, and the lift ramp 28 are housed internally between the hand with finger 10 and the base 20.

The motorized finger activator device generally works by setting the switch 32 to the "On" position to power up the motorized finger activator device via an electric gearmotor (not shown in this figure, but described further below, by reference to FIG. 3). Once switched "on" the gearmotor provides power to the eccentric cam 26, which starts to rotate. The lift tab 14 and the lift ramp 28 are positioned so that rotation of the eccentric cam 26 causes the hand with finger 10 to oscillate up and down. Furthermore, the eccentric brackets 12 and the eccentric cam 26 are positioned so that hand with finger 10 oscillates in angular motion around the vertical axis. Specifically, the eccentric cam 26 is mounted on the electric gearmotor shaft. Rotating the eccentric cam 26 cause the hand with finger 10 to make angular oscillation around the vertical pivot. In some embodiments, the finger contact area oscillation distance is at least ten millimeters (10 mm or more) end to end. In some embodiments, the finger contact area oscillation distance is approximately thirteen millimeters (13 mm) end to end. An example of the oscillation distance for the finger contact area is described below, by reference to FIG. 5. As this movement is horizontal, this horizontal degree of freedom ensures that the finger portion of the hand with finger 10 is resting on the touchpad, engaged by weight of the hand with finger 10 component.

As was demonstrated in FIG. 1, the motorized finger activator device is placed on a surface of the laptop near the touchpad. Specifically, the positioning of the motorized finger activator device is optimized when the base 20 sits on the palm rest surface of the laptop, near the touchpad (e.g., just to the side of the touchpad). An oscillating motion results from the eccentric cam 26 rotating, which causes the finger portion of the hand with finger 10 to glide back and forth on the touchpad. While not shown in this figure, the end/bottom of the finger portion of the hand with finger 10 comprises a conductive cushion. When electrically connected to larger conductive bodies, the conductive cushion presents sufficient electrical capacitance to effectuate an input that is detectable by the touchpad. As a result, this triggers the cursor to move back and forth on the laptop display. This interaction (cursor moving back and forth) is sufficient to keep the laptop in an awake state, out of sleep mode.

Notably, there are different versions of the motorized finger activator device that are supported and their relative placement, with respect to the touchpad, also differ. However, their overall functionality remain the same. Thus, in some embodiments, placement of the base 20 of the motorized finger activator device is intended to be on the palm rest surface of the laptop, near the touchpad. In some other embodiments, placement of the base 20 of the motorized finger activator device is intended to be on the touchpad itself, in a way the ensures that the finger portion of the hand with finger 10 component is able to contact the touchpad during the oscillating motion effectuated by active rotation of the eccentric cam 26.

To make the motorized finger activator device for interaction with a touch-sensitive computing input device of the present disclosure, one may assembly all the components in the relation to the descriptions above. An exploded view of the motorized finger activator device is demonstrated in FIG. 3, which is described next.

Figure 3:
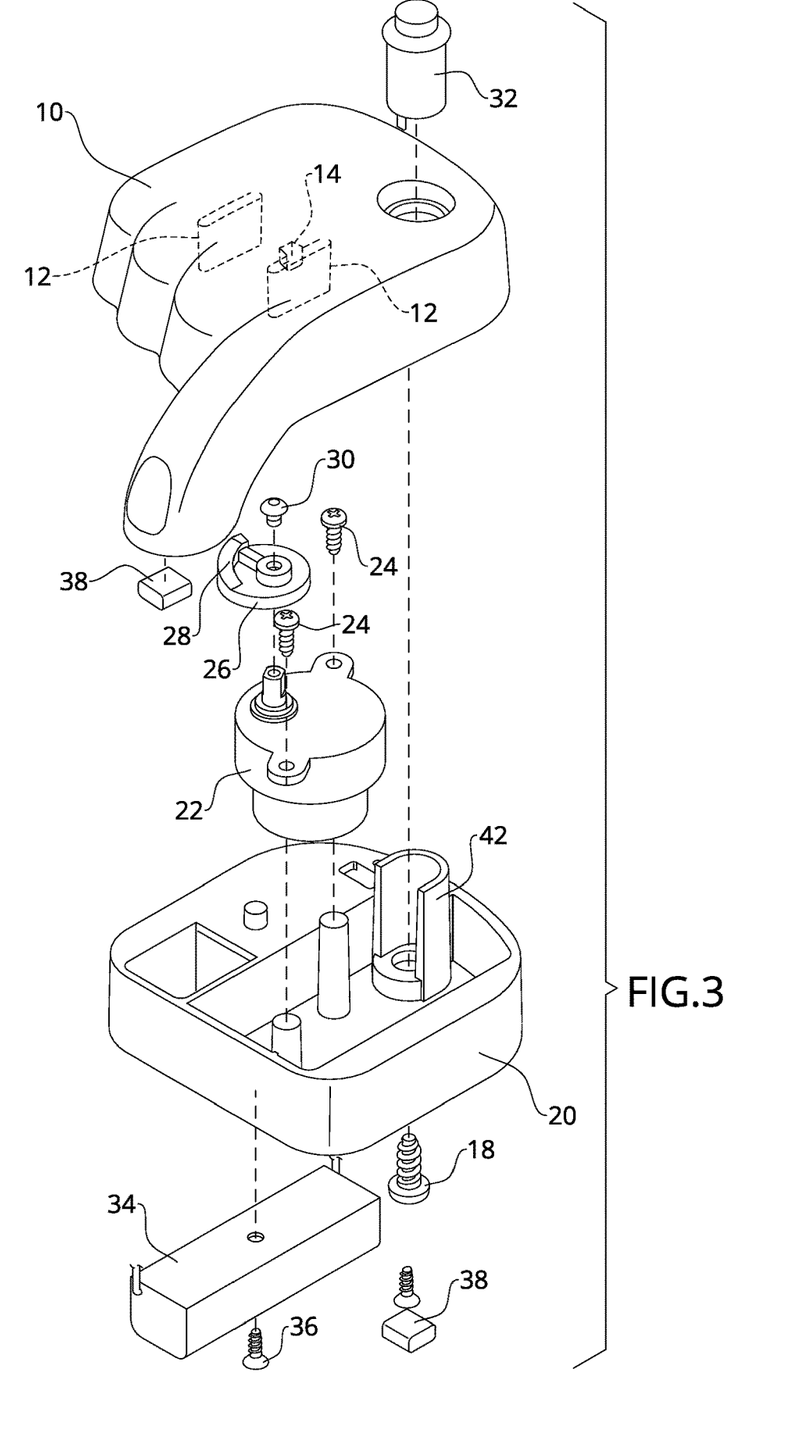
FIG. 3 conceptually illustrates an exploded view of a motorized finger activator device for interaction with a touch-sensitive computing input device in some embodiments.

Specifically, FIG. 3 conceptually illustrates an exploded view of a motorized finger activator device for interaction with a touch-sensitive computing input device in some embodiments. As shown in this figure, the motorized finger activator device comprises the hand with finger 10, the pair of eccentric brackets 12, the lift tab 14, the base 20, the eccentric cam 26, the lift ramp 28, and the switch 32, as described above by reference to FIGS. 1-2. The motorized finger activator device shown in FIG. 3 further comprises a rotation screw 18, a motor 22, a plurality of motor screws 24, an eccentric screw 30, a battery holder 34, a holder screw 36 configured to secure the battery holder 34 in place, a pair of cushions 38, and a base side of rotation axis 42. In some embodiments, the pair of cushions 38 comprises a conductive finger cushion and a base cushion. In some embodiments, a wire connects the conductive finger cushion to the base cushion, which is in contact with an aluminum surface of the laptop to provide electrical capacitance. In some embodiments, the battery holder 34 is configured to hold a battery. In some embodiments, the battery in the battery holder 34 is a "AA" battery. The battery 34, the switch 32, and the motor 22 form a circuit that powers and actuates the motorized finger activator device. Examples of this circuit and their connection to providing electrical capacitance to the conductive cushion are described below, by reference to FIGS. 8-10.

Figure 4:
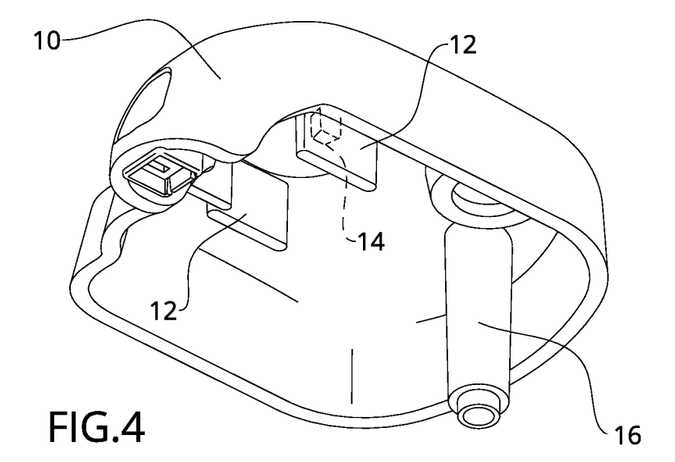
FIG. 4 conceptually illustrates a bottom perspective view of a hand with finger component of a motorized finger activator device for interaction with a touch-sensitive computing input device in some embodiments.

By way of example, FIG. 4 conceptually illustrates a bottom perspective view of a hand with finger component of a motorized finger activator device for interaction with a touch-sensitive computing input device in some embodiments. As shown in this figure, the pair of eccentric brackets 12 and the lift tab 14 are attached to an internal surface of the hand with finger component 10 of the motorized finger activator device. A post 16 is provided as a guiding shaft so that the finger may carry out a pivot action. Specifically, the post 16 enables rotation and additional angular motion in the vertical plane. This angular motion in the vertical plane is the way the motorized finger activator device actuates up and down movement by the finger (similar to tapping). This is further achieved in connection with the base side of rotation axis 42 of the base 20 when the hand with finger 10 component is assembled together with the base 20.

As noted above, FIG. 5 conceptually illustrates a top section view of the motorized finger activator device taken along line 5-5 in FIG. 2. Although vertical movement of the finger is described above, by reference to FIG. 4, the motorized finger activator device is also configured to oscillate in angular motion (more or less "back and forth"). This is shown in this figure, by the dashed arrow. Specifically, oscillation in angular motion occurs while rotating the eccentric cam 26, which causes the hand with finger 10 to make angular oscillation around the vertical pivot. In some embodiments, the finger contact area oscillation distance is ten or more millimeters (10 mm or more) end to end. In some embodiments, the finger contact area oscillation distance is approximately thirteen millimeters (13 mm) end to end.

Figure 5:
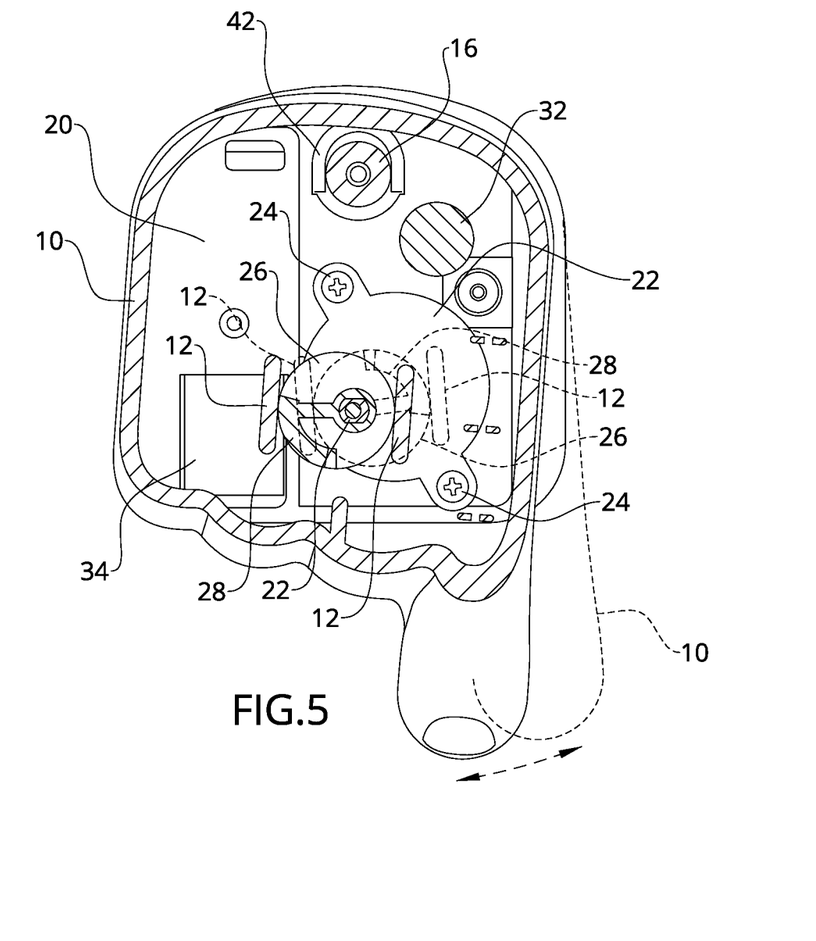
FIG. 5 conceptually illustrates a top section view of the motorized finger activator device taken along line 5-5 in FIG. 2.

The internal components between the hand with finger 10 component and the base 20 are also shown in greater detail in this figure, with respect to this angular motion. Specifically, the internal components shown here include the eccentric brackets 12 (shown in first right lateral position and second left lateral position), the post 16 (which is fixed in a single position during oscillation), the motor 22 (at the base 20 and in a single position during oscillation), the motor screws 24 (at the base 20 and in a single position during oscillation), the eccentric cam 26 (shown between the eccentric brackets 12 in first right lateral position and second left lateral position), the lift ramp 28 (shown on the eccentric cam 26 in first right lateral position and second left lateral position), the switch 32, and the battery/battery holder 34.

While the angular oscillation movement provides sufficient input for detection by the touchpad of the device, some embodiments provide a vertical movement that improves touchpad recognition. In this case, the finger/finger cushion portion of the hand with finger 10 component is lifted a small distance (approximately 2-3 mm vertical) by a spiral cam lift ramp 28 on top of the eccentric cam 26, once per eccentric revolution. The reason for actuating vertical lifting is to ensure that computing devices which are programmed to "ignore" prolonged contact with a touchpad will need to perform a veritable "reset" of the electrical capacitance by removing the finger and retouching the touchpad after a short moment. Periodic lifting of the finger ensures the touchpad continue sensing the moving finger. This vertical lifting is demonstrated next, by reference to FIGS. 6 and 7.

Figure 6:
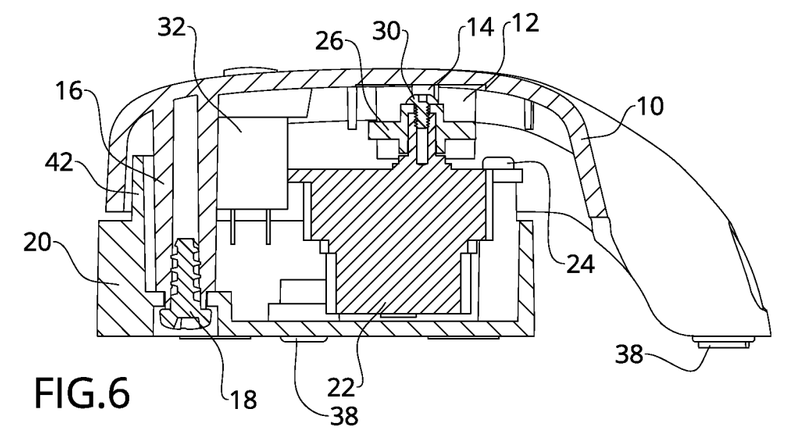
FIG. 6 conceptually illustrates a side section view of the motorized finger activator device with finger down, taken along line 6-6 in FIG. 2.
Figure 7:
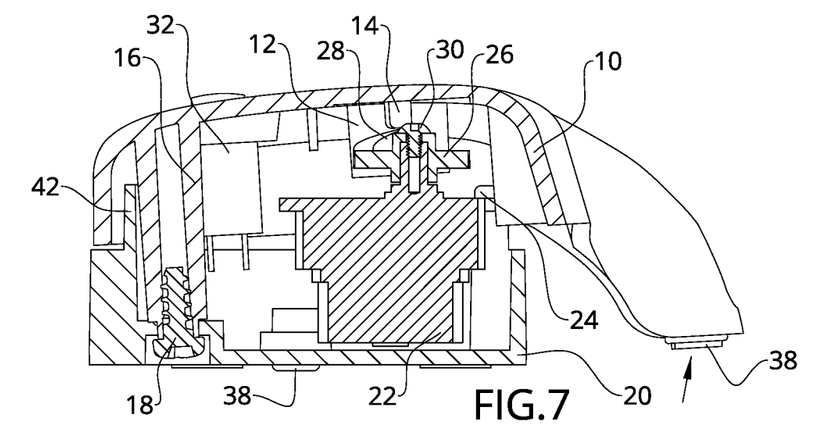
FIG. 7 conceptually illustrates another side section view of the motorized finger activator device with finger raised, taken along line 6-6 in FIG. 2.

Specifically, FIGS. 6-7 conceptually illustrate a side section view of the motorized finger activator device, taken along line 6-6 in FIG. 2, with finger down (in FIG. 6) and finger raised (in FIG. 7). Starting with FIG. 6, the motorized finger activator device includes the hand with finger 10 component, the eccentric brackets 12, the lift tab 14, the post 16, the rotation screw 18, the base 20, the motor 22, the motor screws 24, the eccentric cam 26, the eccentric screw 30, the switch 32, the cushions 38, and base side of rotation axis 42. The cushions 38 shown in these figures include both base cushion 38 disposed along the bottom of the base 20 and finger cushion 38 along the tip of the finger portion of the hand with finger 10 component.

The contact area of a finger cushion 38 is designed to approximate human finger geometry. In some embodiments, the cushion 38 comprises a small EMI conductive gasket bonded to the end of the finger portion of the hand with finger 10 component for this purpose. In some embodiments, the small EMI conductive gasket comprises an 8×8 mm EMI conductive gasket. In some embodiments, the gearmotor 22 comprises an electric gearmotor 22. In some embodiments, the gearmotor 22 is powered by 1.5 VDC supplied by the battery 34 ("AA" battery) held in battery holder. In some embodiments, the gearmotor is capable of an output speed of approximately five rpm (5 rpm).

As shown in FIG. 6, the finger cushion 38 is lowered to a point of making contact with the surface of the touchpad. Turning to FIG. 7, the finger cushion 38 is raised vertically a small distance which momentarily breaks surface contact with the touchpad.

Figure 8:
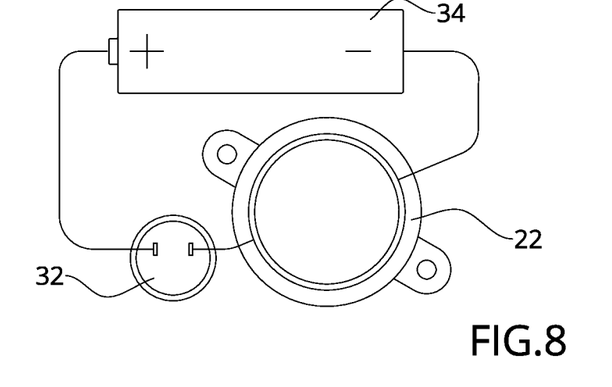
FIG. 8 conceptually illustrates a conductive plastic-based electrical capacitance circuit that provides an electrically conductive finger cushion for touchpad sensing in some embodiments.

By way of example, FIG. 8 conceptually illustrates a conductive plastic-based electrical capacitance circuit that provides an electrically conductive finger cushion for touchpad sensing in some embodiments. As shown in this figure, the battery 34, the switch 32, and the motor 22 form a circuit that powers and actuates the motorized finger activator device. In this view, wires connect the battery 34 to the switch 32 out of the positive terminal and the battery 34 to the motor 22 out of the negative terminal. Another wire connects the switch 32 to the motor 22. When the switch is pressed to the "On" position, the circuit is closed. When switched to the "Off" position, the circuit is open, no power. In this example, the hand with finger 10 and the base 20 are made of conductive plastic which gives rise to electrical capacitance in the finger cushion 38 so that the touchpad of the laptop can detect when the cushion 38 at the end of the finger portion of the hand with finger 10 is moving back and forth (sliding on the surface of the touchpad, so to speak) or moving up and down (tapping the touchpad, so to speak). As a material for the hand with finger 10 component and the base 20 component, conductive plastic can be created and applied via metal coating or by adding carbon powder filler in the plastic during fabrication.

Figure 9:
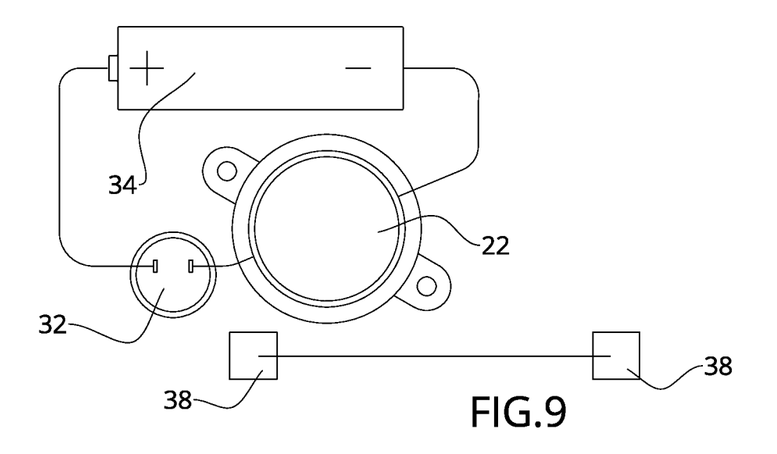
FIG. 9 conceptually illustrates two-cushion electrical capacitance in which a base cushion contacts an aluminum body of a laptop to provide electrical capacitance through another cushion at the tip of the finger for the motorized finger activator device in some embodiments.

Now, turning to another circuit view, FIG. 9 conceptually illustrates two-cushion electrical capacitance in which a base cushion contacts an aluminum body of a laptop to provide electrical capacitance through another cushion at the tip of the finger for the motorized finger activator device in some embodiments. As shown in this figure, connecting the finger cushion 38 of the hand with finger 10 component to the base cushion 38 of the base 20 component by a wire creates electrical capacitance at the finger cushion 38 because the base cushion 38 is in contact with the aluminum body of the laptop, which becomes part of the capacitance. In this way, there is no need for the hand with finger 10 component and/or the base 20 component to be made of conductive plastic to achieve capacitance.

Figure 10:
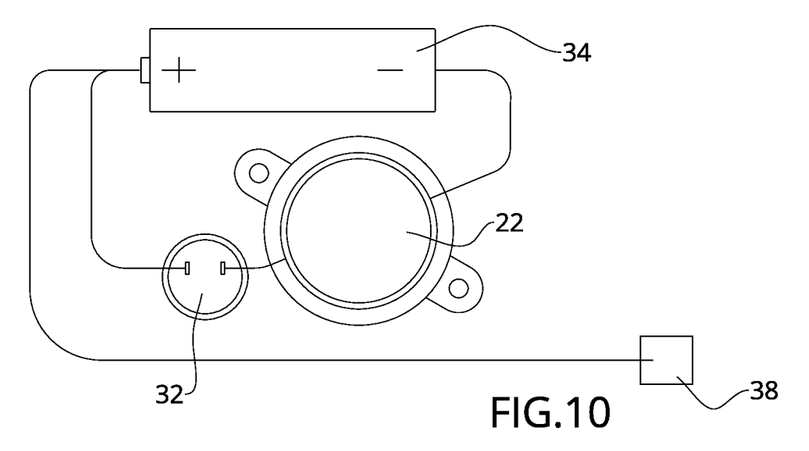
FIG. 10 conceptually illustrates a cushion of the motorized finger activator device connects to any element of an electrical circuit formed in the motorized finger activator device to create electrical capacitance for the cushion in some embodiments.

By way of another example, FIG. 10 conceptually illustrates a cushion 38 of the motorized finger activator device which connects to the battery 34 (but may connect to any element of an electrical circuit formed in the motorized finger activator device) to create electrical capacitance for the cushion 34 in some embodiments. Specifically, the cushion 38 is the finger cushion 38 at the end of the finger part of the hand with finger 10 component. A wire runs through the internal 'finger' to connect the cushion 34 to any node of the electrical circuit that is formed between the motor 22, the switch 32, and the battery 34. In this way, the motor 22, the switch 32, and the battery 34, along with their connecting wires all participate in creating electrical capacitance. In this case, there is no need for the material of the hand with finger 10 component or the base 20 component to be made of conductive plastic.

The above-described embodiments of the invention are presented for purposes of illustration and not of limitation. The constituent components/elements of the disclosed motorized finger activator device listed herein are intended to be exemplary only, and it is not intended that this list be used to limit the motorized finger activator device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed motorized finger activator device as described herein are presented as illustrative examples only, and not intended to limit the scope or nature of the relationships between the various elements. Persons of ordinary skill in the art may appreciate that numerous design configurations may be possible to enjoy the functional benefits of the motorized finger activator device. In particular, instead of a hand with finger design, the motorized finger activator device can take any of several different shapes and forms. For instance, instead of a 'motorized finger' form, the motorized finger activator device could be formed as a cat with paw or any other aesthetically interesting shape/form. Thus, given the wide variety of configurations and arrangements of embodiments of the present invention the scope of the invention is reflected by the breadth of the claims below rather than narrowed by the embodiments described above.

We claim:

1. A motorized finger activator device for interaction with a touch-sensitive computing input device to prevent activation of sleep mode, said motorized finger activator device comprising:
   a base component that is configured to rest on a surface of
      a laptop that is equipped with a touchpad;
   a hand with finger component that attaches to the base component, wherein the hand with finger component comprises a fingertip portion and a conductive cushion disposed on an end of the fingertip portion, wherein the conductive cushion at the end of the fingertip portion of the hand with finger component is positioned to contact the touchpad;

a switch that is exposed through a surface of the hand with finger component and is configured to turn power on and off when activated to turn power on, wherein the hand with finger component performs oscillating motion back and forth and up and down when the switch is activated to turn power on, wherein the touchpad is configured to detect electrical capacitance present in the conductive cushion at the end of the fingertip portion as the conductive cushion contacts the touchpad during the oscillating motion of the hand with finger component; and a battery that provides electric power for the hand with finger component to perform the oscillating motion when the switch is activated to turn power on.

2. The motorized finger activator device of claim 1, wherein the oscillating motion back and forth comprises a horizontal distance of at least ten millimeters.

3. The motorized finger activator device of claim 1, wherein the oscillating motion up and down comprises a vertical distance of two or more millimeters.

4. The motorized finger activator device of claim 1 further comprising:

a pivot screw that secures the hand with finger component to the base component;

a gearmotor comprising an output shaft;

an eccentric cam attached to the output shaft of the gearmotor, wherein the eccentric cam is configured to rotate upon operation of the gearmotor; and internal wires that connect the battery, the gearmotor, and the switch to complete a circuit for operation of the gearmotor.

5. The motorized finger activator device of claim 4, wherein the base component is made of electrically conductive plastic.

6. The motorized finger activator device of claim 4, wherein the hand with finger component is made of electrically conductive plastic.

7. The motorized finger activator device of claim 4 further comprising a second conductive cushion that is disposed along a bottom surface of the base component and configured to contact the surface of the laptop when the base component rests on the surface of the laptop.

8. The motorized finger activator device of claim 4 further comprising a wire that connects the conductive cushion at the end of the fingertip portion of the hand with finger component to a particular node of the circuit.

9. The motorized finger activator device of claim 8, wherein the particular node comprises one of the battery, the gearmotor, and the switch.

10. The motorized finger activator device of claim 4, wherein the pivot screw provides a degree of freedom of movement for the hand with finger component to perform the oscillating motion.

11. The motorized finger activator device of claim 4, wherein the gearmotor is configured to operate at two to eight rpm (2-8 rpm) and provide one and a half volts of direct current (1.5 VDC).

12. The motorized finger activator device of claim 4, wherein the eccentric cam comprises a lift ramp.

13. The motorized finger activator device of claim 12 further comprising a pair of eccentric cam brackets disposed along an internal surface of the hand with finger component.

14. The motorized finger activator device of claim 13, wherein the eccentric cam is contained within the pair of eccentric cam brackets on the hand with finger, wherein the hand with finger component performs the oscillating motion rotationally around the pivot screw when the eccentric cam is rotating within the pair of eccentric cam brackets.

15. The motorized finger activator device of claim 1, wherein the conductive cushion comprises a square eight millimeter by eight millimeter electromagnetic interference (EMI) gasket strip.

* * * * *